(12) United States Patent
Bansal et al.

(10) Patent No.: US 8,577,328 B2
(45) Date of Patent: Nov. 5, 2013

(54) ASSOCIATING METRO STREET ADDRESS GUIDE (MSAG) VALIDATED ADDRESSES WITH GEOGRAPHIC MAP DATA

(75) Inventors: Ritesh Bansal, Mountain View, CA (US); David Byron, Oakland, CA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 1535 days.

(21) Appl. No.: 11/506,859

(22) Filed: Aug. 21, 2006

(65) Prior Publication Data

US 2008/0065628 A1    Mar. 13, 2008

(51) Int. Cl.
*H04M 11/04*    (2006.01)

(52) U.S. Cl.
USPC .................. 455/404.2; 455/404.1; 455/456.1; 379/45

(58) Field of Classification Search
USPC .................... 455/404.1, 404.2, 456.1; 379/45
See application file for complete search history.

(56) References Cited

U.S. PATENT DOCUMENTS

| | | |
|---|---|---|
| 5,006,837 A | 4/1991 | Bowers |
| 5,200,738 A | 4/1993 | Fumoto et al. |
| 5,263,136 A | 11/1993 | DeAguiar |
| 5,781,200 A | 7/1998 | Lu |
| 5,973,700 A | 10/1999 | Taylor |
| 6,104,416 A | 8/2000 | McGuinness |
| 6,144,338 A | 11/2000 | Davies |
| 6,262,741 B1 | 7/2001 | Davies |
| 6,434,482 B1 | 8/2002 | Oshida |
| 6,487,495 B1 | 11/2002 | Gale |
| 6,529,143 B2 | 3/2003 | Mikkola |
| 6,529,722 B1 * | 3/2003 | Heinrich et al. ........... 455/404.1 |
| 6,571,169 B2 | 5/2003 | Miyaki |
| 6,587,782 B1 | 7/2003 | Nocek |
| 6,714,205 B1 | 3/2004 | Miyahita |
| 6,734,867 B1 | 5/2004 | Munshi |
| 6,904,176 B1 | 6/2005 | Chui et al. |
| 6,912,545 B1 | 6/2005 | Lundy et al. |
| 6,940,407 B2 | 9/2005 | Miranda-Knapp |

(Continued)

FOREIGN PATENT DOCUMENTS

| | | |
|---|---|---|
| WO | WO00/57291 | 9/2000 |
| WO | WO2006/071271 | 6/2005 |
| WO | WO2006/037218 | 10/2005 |

OTHER PUBLICATIONS

European Search Report received in European Appl. No. 07794624.2 dated Jun. 17, 2010.

(Continued)

*Primary Examiner* — Amancio Gonzalez
(74) *Attorney, Agent, or Firm* — William H. Bollman

(57) ABSTRACT

Master Street Address Guide (MSAG)-validated street address data is correlated with real-world geographic (e.g., latitude/longitude) data. Conventional MSAG-validated street address data is processed, or geocoded, into an additional (or integrated) database that associates latitude/longitude information with a particular entry in the existing MSAG-validated database. The association of the lat/lon data may be direct, or indirect using link ID or other unique tags indicating a particular entry in the MSAG-validated database. The geocoding need be performed only once by a service provider, e.g., as part of the deployment of an emergency service system. In this way, the closest public service answering point (PSAP) to a given latitude/longitude position of a wireless or VoIP device may be determined quickly, providing emergency services with the smallest possible reliable response time.

11 Claims, 4 Drawing Sheets

(56) References Cited

U.S. PATENT DOCUMENTS

| | | |
|---|---|---|
| 7,190,839 B1 | 3/2007 | Feather et al. |
| 7,385,600 B2 | 6/2008 | Marion |
| 7,840,579 B2 | 11/2010 | Samuelson |
| 2002/0021231 A1 | 2/2002 | Schlager |
| 2002/0067353 A1 | 6/2002 | Kenyon |
| 2002/0190861 A1 | 12/2002 | Wentworth |
| 2003/0011623 A1 | 1/2003 | Dermer |
| 2003/0016804 A1 | 1/2003 | Shena et al. |
| 2003/0034936 A1 | 2/2003 | Ernst |
| 2003/0055555 A1 | 3/2003 | Knockeart et al. |
| 2003/0071728 A1 | 4/2003 | McDonald |
| 2003/0137961 A1 | 7/2003 | Tsirtsis et al. |
| 2004/0030493 A1 | 2/2004 | Pechatnikov |
| 2004/0135784 A1 | 7/2004 | Cohen |
| 2004/0158829 A1 | 8/2004 | Beresin |
| 2004/0185870 A1 | 9/2004 | Matsuda |
| 2004/0217980 A1 | 11/2004 | Radburn et al. |
| 2005/0270311 A1 | 12/2005 | Rasmussen |
| 2005/0288033 A1 | 12/2005 | McNew |
| 2006/0005114 A1 | 1/2006 | Williamson |
| 2006/0023626 A1 | 2/2006 | Krausz |
| 2006/0055693 A1 | 3/2006 | Sylthe |
| 2006/0058943 A1 | 3/2006 | Pascual |
| 2006/0068753 A1 * | 3/2006 | Karpen et al. ............. 455/404.2 |
| 2006/0088356 A1 | 4/2006 | Jawerth |
| 2006/0105782 A1 | 5/2006 | Brock |
| 2006/0135178 A1 | 6/2006 | Allyn |
| 2006/0224997 A1 | 10/2006 | Wong et al. |
| 2006/0246922 A1 | 11/2006 | Gasbarro |
| 2006/0256130 A1 | 11/2006 | Gonzalez |
| 2007/0041513 A1 * | 2/2007 | Gende ............................ 379/37 |
| 2007/0072620 A1 | 3/2007 | Levitan |
| 2007/0149243 A1 * | 6/2007 | Hwang et al. ................. 455/551 |

OTHER PUBLICATIONS

PCT International Search Report (PCTUS2007/11027) and Written Opinion of International Searching Authority, Feb. 21, 2008.

International Search Report received in PCT/US2008/10542 dated Nov. 26, 2008.

NENA Statement on VoIP E9-1-1 Implementation Issues, National Emergency Number Association, Mar. 2006.

* cited by examiner

ASSOCIATING METRO STREET ADDRESS GUIDE (MSAG) VALIDATED ADDRESSES WITH GEOGRAPHIC MAP DATA

BACKGROUND OF THE INVENTION

1. Field of the Invention

This invention relates generally to wireless devices as they relate to geographic information systems. More particularly, it relates to the provision of 911 services for wireless users to a Public Safety Answering Point (PSAP).

2. Background of the Related Art

Current public safety infrastructure is heavily wedded to wireline interfaces and to the notion that every E911 caller has a street address-not simply to the notion that latitude/longitude coordinates is more amenable to the mobile phone culture of today. As a result, the E911 industry is challenged with the ability to automatically and reliably deliver location information to the Public Safety Answering Points (PSAPs) for wireless devices. This is also true for most Voice Over Internet Protocol (VoIP) devices, which by the ubiquitous nature of the Internet are not always fixed in location.

For illustration purposes, FIG. 3 shows a conventional E911 VoIP scenario.

In particular, as shown in FIG. 3, a VoIP carrier 100 includes a call server 202 and an Emergency Services Gateway (ESGW) 204.

A service bureau 120 includes a network location information server (LIS) 206, a Session Initiated Protocol (SIP) server (redirect) 208, and a VoIP positioning center (VPC) 210. Also included in the service bureau 120 is an Emergency Services Zone (ESZ) route database (DB) 220, and a validation database (DB) 230.

Also within the network are the Public Switched Telephone Network (PSTN) 130, a selective router 140, a Public Safety Answering Point (PSAP) 180, an Automatic Location Identification (ALI) database 190, a Master Street Address Guide (MSAG) 195, an Internet Protocol (IP) phone 150, a provisioning system 160, and a local Location Information Server (LIS) 170.

FIG. 4 shows exemplary call flow for the conventional E911 VoIP scenario shown in FIG. 3.

In particular, as shown in step 1 of FIG. 4, a caller on the IP phone 150 dials 9-1-1; and the call proceeds to the VoIP call server 202.

In step 2, the VoIP call server 202 sends a Session Initiated Protocol: uniform Resource Identifier (SIP:URI) to the SIP Server (redirect) 208.

In step 3, the SIP Server 208 queries the VoIP Positioning Center (VPC) 210 for an Emergency Services Routing Number (ESRN) and an Emergency Services Query Key (ESQK). This is conventionally based on a fixed street address that is configured for the particular VoIP user.

In step 4, the VoIP Positioning Center (VPC) 210, via the SIP Server 208, returns the ESRN & ESQK to the VoIP Carrier 100.

In step 5, the call server 202 uses the returned ESRN to route the wireless 911 call to the Emergency Services Gateway (ESGW) 204.

In step 6, the Emergency Services Gateway (ESGW) 204 routes the wireless 911 call to the selective router 140.

In step 7, the wireless 911 call is sent to the Public Safety Answering Point (PSAP) with the ESQK.

In step 8, the Public Safety Answering Point (PSAP) queries the Automatic Location Identification (ALI) database 190 using the ESQK.

In step 9, the Automatic Location Identification (ALI) database 190 queries the VoIP Positioning Center (VPC) 210 with the ESQK.

In step 10, the Service Bureau 120 matches the ESQK and returns location information.

Emergency services are most easily provided to a caller using a phone in a fixed location (e.g. a landline). For this situation, a table is created that associates an emergency service number (ESN) to each phone number. However, for a wireless phone the inventors herein realize that this approach no longer works as the location of the phone can change. Given the global positioning satellite (GPS) location (latitude/longitude) of a mobile phone (provided by the relevant cellular service carrier), the task remains to determine the emergency service number (ESN) of the closest PSAP.

Unfortunately, static tables associating phone numbers to ESNs do not work for a wireless or mobile caller, because their location is not determined merely using their phone number and a lookup in the static table. The provision of an acceptable location for a mobile device or even a VoIP device which may or may not be mobile presents a number of challenges, not the least of which is Metro Street Address Guide (MSAG) validation of their location.

Fundamentally, MSAG is a legacy requirement from PSAPs that did (and some still do) have "dumb" terminals that receive the call and display validated street address information to the call taker. In early PSAP systems, information delivery was slow and cumbersome, so the industry worked on developing a set of abbreviations that would allow an address to fit into about 20 characters.

The entire conventional call scenario depicted in FIG. 4 presumes that a database record exists that identifies the location of the customer, and that the database record exists as an MSAG-validated address. In reality, this is not necessarily the case. Nevertheless, current PSAP architectures have entire response procedures built around street addresses only, and use the street address as a key to a table for looking up the appropriate emergency response. Accordingly, the bottom line is that conventional PSAPs require that location information be an MSAG-validated street address to guarantee that the PSAP database lookup will not fail.

Wireless Phase I requirements defined by NENA provide E9-1-1 for VoIP using PSAP administrative lines. Wireless Phase II requirements defined by NENA provide E9-1-1 for VoIP across traditional 9-1-1 channels. In wireless Phase II, the location of the caller is dynamically extracted from the network. This results in a latitude/longitude (lat/lon) coordinate being provided to the PSAP. Those PSAPs which have been upgraded to handle lat/lon receive the information and display it on a screen driven by a Graphical Information System (GIS), i.e., they see a map with a "caller is here" flag or dot. Such a conventional system is suitable in PSAPs which have upgraded to handle these Wireless Phase II calls (currently somewhere north of 40% of all PSAPs). However, older PSAPs still need address information, and they expect to receive an MSAG-validated address. So, for wireless, the address is given as the center of the cell site/sector which is serving the caller. Not very precise, but good enough to get emergency services in a vicinity of a wireless caller.

With Voice Over Internet Protocol (VoIP) usage, it is desirable to apply a similar model as is done in wireless, i.e., to dynamically extract location information from the network, and present it to the PSAP. Unfortunately, VoIP systems, being based on the ubiquitous Internet, can be even more difficult to locate than a wireless device as they do not always have the luxury of a cell site/sector overlay to fall back on. In other words, a VoIP caller can make a 911 call from anywhere in the country, but there is no credible database of MSAG-validated addresses for the Internet routers to deliver the 911 call.

There is a need for a way for wireless and/or VoIP users to have the best of both worlds-provision of location information in latitude/longitude (lat/lon) coordinates to a PSAP, while at the same time providing the PSAP with an MSAG-validated street address location.

SUMMARY OF THE INVENTION

In accordance with the principles of the present invention, a geocoder device and method comprises inputing data from a metro street address guide (MSAG) database. A latitude/longitude location is associated with a plurality of entries in the MSAG database. The associated latitude/longitude location information is stored in a lat/lon association database.

A lat/lon association database for communication over a phone network in accordance with another aspect of the invention comprises a plurality of entries. Each of the plurality of entries associates a street link with its latitude/longitude.

A method and apparatus for determining a validated entry in a metro street address guide (MSAG) associated with a given geographic location, in accordance with yet another aspect of the present invention comprises obtaining a latitude/longitude of an active network device. An addressable street link associated with the obtained latitude/longitude of the active network device is determined. A metro street address guide (MSAG) database is searched for a matching MSAG-validated street address entry to the determined addressable street link.

DETAILED DESCRIPTION OF ILLUSTRATIVE EMBODIMENTS

The present invention correlates Master Street Address Guide (MSAG)-validated street address data with real-world geographic (e.g., latitude/longitude) data. According to the invention, conventional MSAG-validated street address data is processed, or geocoded, into an additional (or integrated) database that associates latitude/longitude information with a particular entry in the existing MSAG-validated database. The association of the lat/lon data may be direct, or indirect using link ID or other unique tags indicating a particular entry in the MSAG-validated database.

Ideally the geocoding need be performed only once by a service provider, e.g., as part of the deployment of an emergency service system. Of course, updated geocoding may be performed from time to time as the content of the MSAG-validated street address database changes or is otherwise revised. In this way, the closest public service answering point (PSAP) to a given latitude/longitude position of a wireless or VoIP device may be determined quickly, providing emergency services with the smallest possible reliable response time.

Figure 1:
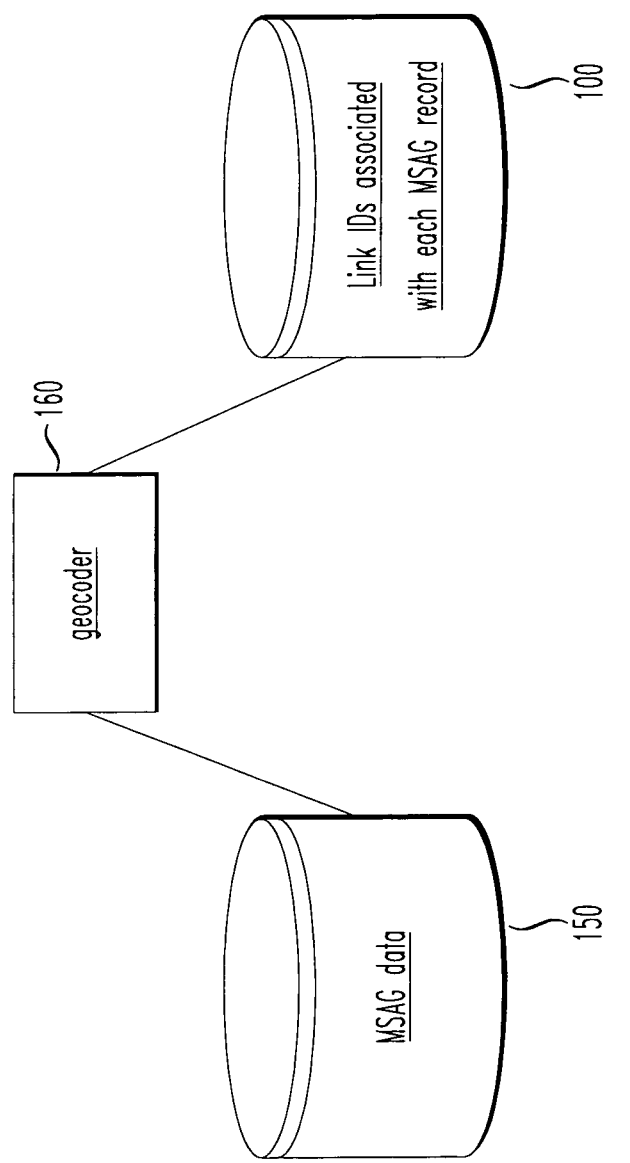
FIG. 1 depicts the geocoding process of MSAG-validated street address data, and the creation of a lat/lon-to-MSAG record database, in accordance with the principles of the present invention.

FIG. 1 depicts the geocoding process of MSAG-validated street address data, and the creation of a lat/lon-to-MSAG record database, in accordance with the principles of the present invention.

In particular, as shown in FIG. 1, MSAG-validated street address data, as depicted by the MSAG database 150, is geocoded by a geocoder 160, to generate associations between entries in the MSAG database 150 and lat/lon positions. These associations are stored in a separate database 100 associating lat/lon positions to a respective closest entry from the MSAG database 150.

The geocoder 160 may be any suitable computer, and need not be performed via a network. Preferably the geocoder 160 is operated by a third party software provider rather than by a wireless or VoIP carrier. However, operation of the geocoder 160 by a wireless or VoIP provider is entirely within the present invention.

The lat/lon association database 100 is shown in FIG. 1 separate from the MSAG-validated street address database 150. Of course, information from the two databases 150, 100 may be integrated into a common database, in accordance with the principles of the present invention.

The disclosed geocoder 160 geocodes, or divides each road in a given area into lengths, or links, and associates each link with a given ID. The number of links for any given street-addressable road is preferably determined by the number of intersections therewith by other streets, the number of driveways, and/or any other relevant points of distinction. Another factor for dividing a street into links are the places on that street where the street address number changes.

It is entirely possible and feasible that more than one link will be associated with a same entry in the MSAG-validated street address database 150. For instance, multiple intersections may occur on a street in front of a single street addressed home or business. In this case, the multiple intersections would each associate to a same entry in the MSAG-validated street address database 150 for that single home or business.

A dataset contained in the MSAG-validated street address database 150, and/or in the lat/lon association database 100, may describe a small region, state, or even the entire country. In any event, it is import that each link have an identifier that's unique in a given geographic data set. But again, it's entirely possible that multiple identifiers point to a same entry in the MSAG-validated street address database 150.

Geocoding 160 of the MSAG-validated street address database 150 takes each street address entry in the MSAG-validated street address database 150 as input, and outputs an associated latitude/longitude for each input street address entry.

The exact latitude/longitude designated for any given link is preferably that of a central point of the link. The central point may be determined in any suitable mathematical method for determining a center of an area. As another example, the central point for which the lat/lon data is assigned may be a 2-dimensional calculation measured as a midpoint of a linear line drawn along the pathway of the centerline of the street link. If the link is rectangular, the center point may be the cross-point of two straight lines drawn from opposing corners of the rectangle. The central point may also be calculated in 3-dimensions using not only the geographic shape of the length and width of the link, but also variation in altitude.

The lat/lon assigned to any given link may be a range of lat/lon values, though such implementation adds significantly to complexity of the lat/lon association database 100.

In addition to the exact latitude/longitude, the geocoding also determines a unique link ID for each link in the lat/lon association database 100. The format of the link ID may be any suitable format for a database. In the preferred embodiment, the link ID is uniquely assigned for each entry in the lat/lon association database 100.

Each MSAG record in the MSAG-validated street address database 150 associates an address range with an emergency services number (ESN), and therefore a particular public safety answering point (PSAP) responsible for that geographic location. The present invention associates MSAG record entries with IDs for all links in the address range, thus solving the conventional problem of reliably locating the closest PSAP to a given lat/lon position as a simple lookup of the link ID for a given lat/lon position.

Figure 2:
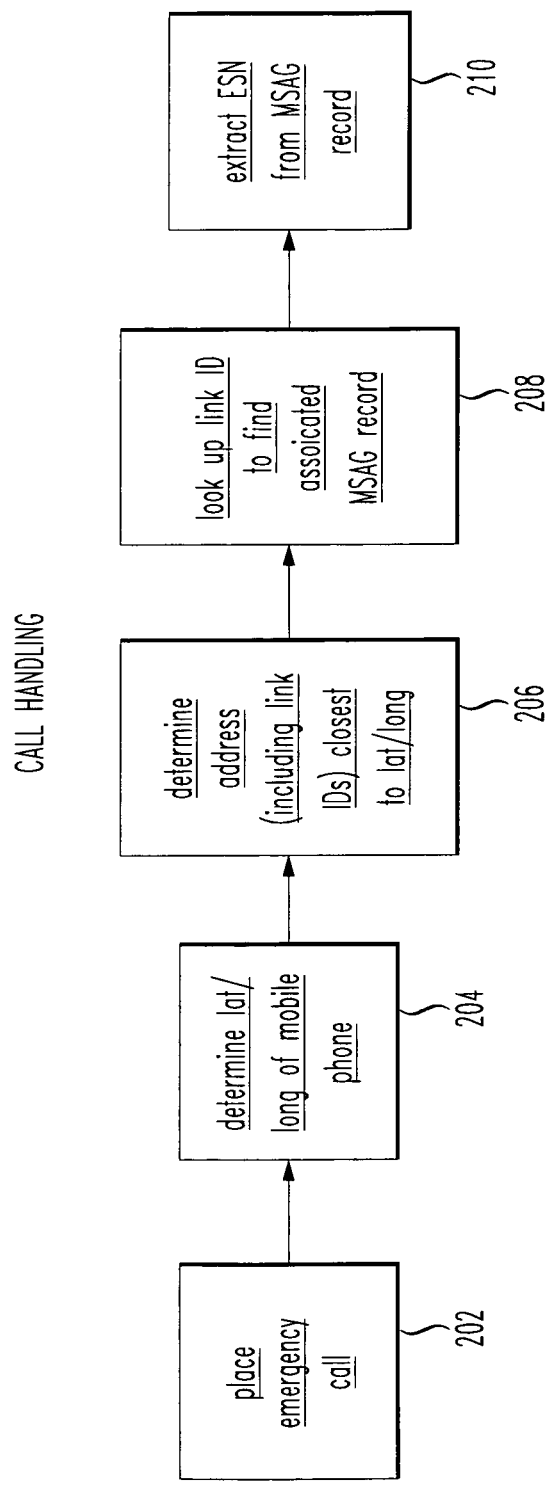
FIG. 2 shows an exemplary call handling process using a table associating at/long data with a closest MSAG record, formed from geocoding, in accordance with the principles of the present invention.
Figure 3:
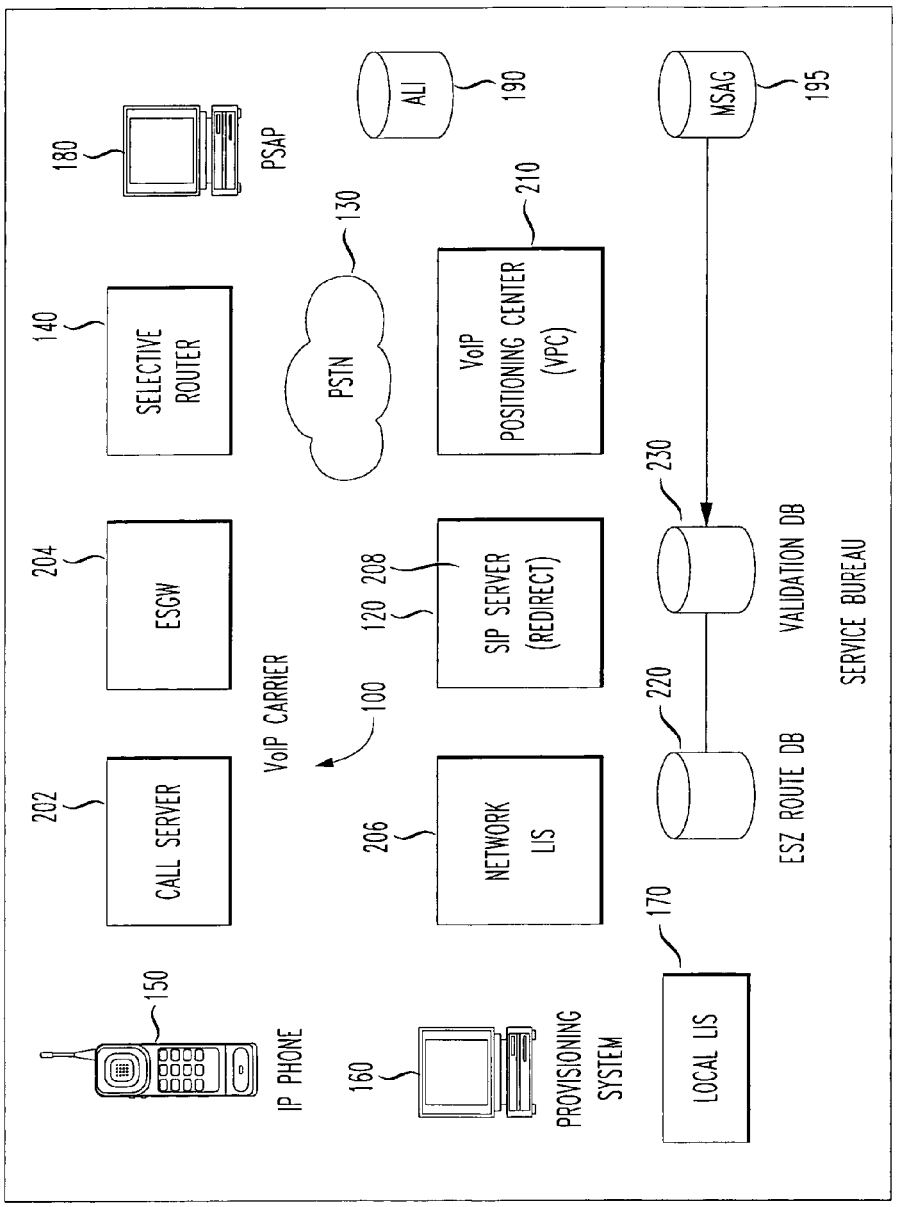
FIG. 3 shows a conventional E911 VoIP scenario.
Figure 4:
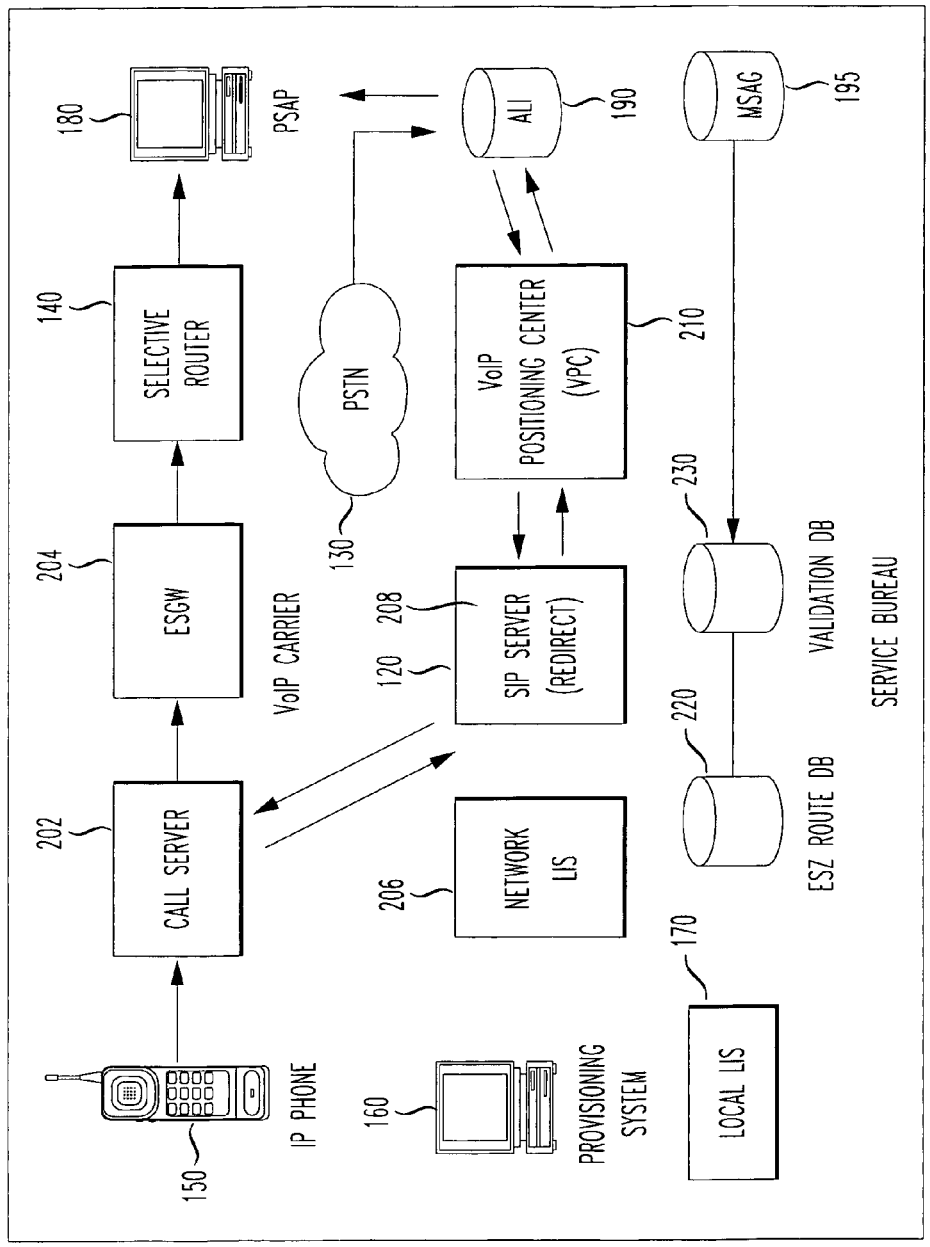
FIG. 4 shows exemplary call flow for the conventional E911 VoIP scenario shown in FIG. 3.

FIG. 2 shows an exemplary call handling process using a table associating lat/long data with a closest MSAG record, formed from geocoding, in accordance with the principles of the present invention.

In particular, as shown in step 202 of FIG. 2, an emergency 911 call is placed from a wireless or VoIP device.

In step 204, the lat/lon of the 911 caller is determined. This determination may be performed in any conventional manner, including cell site location, global positioning satellite (GPS), etc.

In step 206, the closest street link ID entry in the lat/lon association database 100 is determined, based on the latitude/longitude data determined in step 204.

In step 208, using the closest link ID determined in step 206, a look up is performed in the MSAG-validated database 150, to find the associated MSAG-validated record in the MSAG-validated database 150.

In step 210, the emergency services number (ESN) of the PSAP assigned to the location of the wireless or VoIP 911 caller is extracted from the associated MSAG-validated record matched in step 208.

Thus, each MSAG address range in an otherwise conventional MSAG-validated street address database 150 is geocoded to find associated link IDs and corresponding latitude/longitude data for each link ID, and that association is stored in a data table. Then, when an emergency call arrives, the link ID is determined based on a lat/lon of a calling wireless or VoIP party via look up in a lat/lon association table. If it is present in the lat/lon association database 100, the link ID of that match in the lat/lon association table is used in a look up in the MSAG-validated street address database 150 to find the relevant MSAG-validated record nearest to the current position of the wireless or VoIP 911 caller. The emergency services number (ESN) is extracted from the matched MSAG-validated record.

If the emergency caller's link ID isn't found in the lat/lon association table, it would indicate that the data contained in the MSAG-validated street address database 150 is incomplete. To this end, the geocoding process of each MSAG record in the MSAG-validated street address database 150 helps to validate the MSAG data. If a particular MSAG record fails to geocode, it indicates that something is inconsistent between the MSAG and the real-world geographic data. It is also possible for MSAG records to overlap. Thus, the present invention not only provides reliable MSAG-validated street address information to emergency services for wireless and/or VoIP 911 callers, it actually improves the quality and reliability of the MSAG-validated database 150 itself, by way of resolution of any inconsistencies in the geocoding process.

Since geocoding in accordance with the present invention occurs early in the process, it is possible to resolve these inconsistencies ahead of time, before any negative impact to emergency calls can occur, again not only equaling the reliability of wireline emergency calls with wireless and/or VoIP callers, but actually improving upon it.

The present invention has particular applicability to providers of E911 emergency services for wireless devices, especially mobile phones.

While the invention has been described with reference to the exemplary embodiments thereof, those skilled in the art will be able to make various modifications to the described embodiments of the invention without departing from the true spirit and scope of the invention.

What is claimed is:

1. A geocoder device, comprising:
    a module to obtain a latitude/longitude (lat/lon) of an active Voice Over Internet Protocol (VoIP) network device;
    a module to look-up a closest road length ID associated with said obtained latitude/longitude of said active VoIP network device; and
    a module to look-up a Master Street Address Guide (MSAG)-validated street address associated with said closest road length ID addressable in said lat/lon association database;
    wherein a given length road is divided into a plurality road lengths associated with a plurality of road length IDs.

2. The geocoder device according to claim 1, wherein:
    said lat/lon association database is integrated with an MSAG database.

3. The geocoder device according to claim 1, wherein:
    said lat/lon association database is maintained separate from an MSAG database.

4. The geocoder device according to claim 1, wherein:
    said obtained latitude/longitude is a location of a center of said closest road length ID.

5. A method of determining a validated entry in a metro street address guide (MSAG) associated with a given geographic location, comprising:
    obtaining a latitude/longitude (lat/lon) of an active Voice Over Internet Protocol (VoIP) network device;
    looking-up a closest road length ID in a lat/lon association database associating a plurality of latitude/longitudes with a plurality of road length IDs;
    looking-up a Master Street Address Guide (MSAG)-validated street address associated with said closest road length ID addressable in said lat/lon association database;
    wherein a given length road is divided into a plurality road lengths associated with a plurality of road length IDs.

6. The method of determining a validated entry in a metro street address guide (MSAG) associated with a given geographic location according to claim 5, further comprising:
    extracting an emergency services number (ESN) associated with said matching MSAG-validated street address entry.

7. The method of determining a validated entry in a metro street address guide (MSAG) associated with a given geographic location according to claim 6, further comprising:
    routing a call from said active VoIP network device based on said extracted ESN.

8. The method of determining a validated entry in a metro street address guide (MSAG) associated with a given geographic location according to claim 7, wherein:
    said active VoIP network device is a wireless phone.

9. The method of determining a validated entry in a metro street address guide (MSAG) associated with a given geographic location according to claim 7, wherein:
  said active VoIP network device is a voice over Internet Protocol (VoIP) phone device.

10. The method of determining a validated entry in a metro street address guide (MSAG) associated with a given geographic location according to claim 9, wherein:
  said active VoIP network device is a wireless VoIP network device.

11. The method of determining a validated entry in a metro street address guide (MSAG) associated with a given geographic location according to claim 5, wherein:
  said active VoIP network device is a wireless phone.

* * * * *